US012559435B2

(12) United States Patent | (10) Patent No.: | US 12,559,435 B2
Shim et al. | (45) Date of Patent: | Feb. 24, 2026

(54) SILICON CARBIDE COATINGS AND METHODS OF FABRICATING AND REPAIRING THE SAME

(71) Applicant: Blue Origin Manufacturing, LLC, Huntsville, AL (US)

(72) Inventors: Sungbo Shim, Irvine, CA (US); Li Li, Redmond, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/400,201

(22) Filed: Dec. 29, 2023

(65) Prior Publication Data

US 2025/0214904 A1 Jul. 3, 2025

(51) Int. Cl.
*C04B 41/50* (2006.01)
*C04B 35/83* (2006.01)
(Continued)

(52) U.S. Cl.
CPC .......... *C04B 41/5059* (2013.01); *C04B 35/83* (2013.01); *C04B 41/0072* (2013.01); *C04B 41/4539* (2013.01); *C04B 41/4554* (2013.01); *C04B 41/5096* (2013.01); *C04B 41/52* (2013.01); *C04B 41/87* (2013.01); *C04B 41/89* (2013.01)

(58) Field of Classification Search
CPC .......................... C04B 41/5059; C04B 41/4539
See application file for complete search history.

(56) References Cited

U.S. PATENT DOCUMENTS 4,535,035 A 8/1985 Smialek et al.
4,830,919 A 5/1989 Shuford
(Continued)

FOREIGN PATENT DOCUMENTS

CN 103601528 B 5/2015
CN 105924235 A * 9/2016 ........... C04B 41/009
(Continued)

OTHER PUBLICATIONS

Fan, Guofeng, et al. "Study on purification technology of silicon carbide crystal growth powder." Materials 15.22 (2022): 8190. (Year 2022).*
(Continued)

*Primary Examiner* — Cameron K Miller
(74) *Attorney, Agent, or Firm* — Knobbe, Martens, Olson & Bear, LLP

(57) ABSTRACT

A slurry for use to form or repair a silicon carbide coating is provided. In one aspect, the slurry includes solid particles and a carbonaceous resin. The solid particles include silicon carbide particles, silicon particles, and carbon particles. A method of fabricating a silicon carbide coating is also provided. In one aspect, the method includes applying the slurry, heating the slurry, and forming the silicon carbide coating from the solid particles and the carbonaceous resin. A method of repairing a silicon carbide coating is also provided. In one aspect, the method includes applying the slurry to a damaged region of the silicon carbide coating, heating the slurry, and repairing the silicon carbide coating with the solid particles and the carbonaceous resin in the damaged region.

25 Claims, 8 Drawing Sheets

○ 14 (silicon carbide)

○ 15 (silicon)

⊚ 16 (carbon)

(51) Int. Cl.

| | |
|---|---|
| *C04B 41/00* | (2006.01) |
| *C04B 41/45* | (2006.01) |
| *C04B 41/52* | (2006.01) |
| *C04B 41/87* | (2006.01) |
| *C04B 41/89* | (2006.01) |
| *C23C 24/10* | (2006.01) |

(56) References Cited

U.S. PATENT DOCUMENTS

| | | | |
|---|---|---|---|
| 9,512,505 B2 | 12/2016 | Weaver et al. | |
| 9,611,181 B2 | 4/2017 | Tang et al. | |
| 2004/0258919 A1 | 12/2004 | Hong et al. | |
| 2006/0213326 A1* | 9/2006 | Gollob | C04B 35/6365 |
| | | | 427/446 |
| 2007/0172659 A1 | 7/2007 | Shao | |
| 2021/0009479 A1* | 1/2021 | Krause | C04B 35/6263 |
| 2022/0388917 A1 | 12/2022 | Jadidian et al. | |

FOREIGN PATENT DOCUMENTS

| | | | |
|---|---|---|---|
| CN | 108218473 A | 6/2018 | |
| CN | 105924235 B | 12/2018 | |
| CN | 105948819 B | 2/2019 | |
| CN | 106673708 B | 7/2019 | |
| CN | 107935634 B | 8/2020 | |
| CN | 113248283 A | 8/2021 | |
| CN | 113429223 A | 9/2021 | |
| CN | 113943173 A | 1/2022 | |
| CN | 111455375 B | 6/2022 | |
| CN | 112745146 B | 7/2022 | |
| EP | 1 468 976 B1 | 5/2007 | |
| EP | 4 098 640 A1 | 12/2022 | |
| JP | H05-186286 A | 7/1993 | |
| JP | H11-314985 A | 11/1999 | |
| KR | 100515240 B1 | 9/2005 | |

OTHER PUBLICATIONS

Wikipedia article titled "Carbon Black" accessed Apr. 3, 2025 https://en.wikipedia.org/wiki/Carbon_black (Year: 2025).*

Wikipedia article titled "Silicon Carbide" accessed Apr. 3, 2025 https://en.wikipedia.org/wiki/Silicon_carbide (Year: 2025).*

Wikipedia article titled "Silicon" accessed Apr. 3, 2025 https://en.wikipedia.org/wiki/Silicon (Year: 2025).*

CN105924235A machine translation (Year: 2016).*

Li et al., "In situ synthesis of SiC nanowire porous layer on carbon/carbon composites," *Journal of the American Ceramic Society*, 101:1371-1380 (2018).

Muir, Hugh M., "Improved Oxidation-Resistant Carbon and Graphite Materials," NASA Contractor Report, NASA CR-1970, 21 pages (1972).

Zhu et al., "SiC—Si coating with micro-pores to protect carbon/carbon composites against oxidation," *Journal of the European Ceramic Society*, 41:114-120 (2021).

* cited by examiner

202 — Apply slurry to a damaged region

204 — Heat treat

205 — Repair the silicon carbide coating in the damaged region

200

SILICON CARBIDE COATINGS AND METHODS OF FABRICATING AND REPAIRING THE SAME

BACKGROUND

Field

The technology relates generally to oxidation resistant coatings. In particular, the present disclosure relates to slurries for forming or repairing a silicon carbide coating, for example, a silicon carbide coating on a carbon material such as a carbon carbon (C/C) composite material, carbon silicon carbide (C/SiC) composite material, or carbon carbon-silicon carbide (C/C—SiC) composite material.

Description of the Related Art

Carbon carbon (C/C) composite materials are high performance materials that can be used in high temperature environments, such as in components for aircraft, spacecraft, rockets, missiles, and other vehicles. Silicon carbide can be used as a coating to help protect an underlying material (for example, a C/C composite material) from oxidation when used at high temperatures. It is desirable that such silicon carbide coatings are relatively dense for oxidation resistance. There is a need for simple, cost-effective methods to fabricate such silicon carbide coatings that do not compromise the dimensions and/or strength of the underlying material. There is also a need for simple, cost-effective methods to repair silicon carbide coatings that may have been locally chipped or damaged.

SUMMARY

The embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing methods of fabricating and repairing oxidation resistant coatings such as silicon carbide coatings on carbon materials, for example, carbon composite materials such as carbon carbon (C/C) composite materials, carbon silicon carbide (C/SiC) composite materials, or carbon carbon-silicon carbide (C/C—SiC) composite materials.

In various implementations, a slurry is provided. The slurry can be for use to form or repair a silicon carbide coating. The slurry can include solid particles and a carbonaceous resin. The solid particles can include silicon carbide particles, silicon particles, and carbon particles.

In some embodiments, the solid particles can form 25 to 80 volume percent of the slurry.

In some instances, the solid particles can include 40 to 70 volume percent silicon carbide particles.

In some slurries, the solid particles can include less than or equal to 10 volume percent carbon particles.

In some embodiments, the carbon particles can include diamond, graphite, and/or carbon black.

In some instances, the carbonaceous resin can include phenolic ester or cyanate ester.

In some instances, the silicon carbide particles can have an average particle size in the range of 0.5 to 20 microns.

In some slurries, the silicon carbide particles can have a particle size with a bimodal distribution.

In some instances, the silicon particles can have an average particle size in the range of 5 to 20 microns.

In some embodiments, the carbon particles can have an average particle size in the range of 0.5 to 5 microns.

In various implementations, a method of fabricating a silicon carbide coating on a carbon material is provided. The method can include applying a slurry on the carbon material. The slurry can include solid particles and carbonaceous resin. The solid particles can include silicon carbide particles, silicon particles, and carbon particles. The method can also include heating the slurry and forming the silicon carbide coating from the solid particles and the carbonaceous resin.

In some embodiments of the method, heating the slurry can include melting the silicon particles and pyrolyzing the carbonaceous resin. Forming the silicon carbide coating can include the melted silicon particles reacting with the carbon particles and pyrolyzed char from the carbonaceous resin.

In some instances, forming the silicon carbide coating can include the melted silicon particles reacting with less than or equal to 5 percent of carbon of the carbon material.

In some instances, forming the silicon carbide coating can include the carbon particles expanding and filling pores of the silicon carbide coating.

In some methods, the silicon carbide coating can have no more than 5% of porosity.

In some embodiments, the method further can include applying a silicon coating on the carbon material.

For example, the silicon coating can be applied prior to applying the slurry on the carbon material.

As another example, the silicon coating can be applied after applying the slurry on the carbon material.

In some instances, the carbon material can be a carbon carbon (C/C) composite material, a carbon silicon carbide (C/SiC) composite material, or a carbon carbon-silicon carbide (C/C—SiC) composite material.

In various implementations, a method of repairing a silicon carbide coating is provided. The method can include applying a slurry to a damaged region of the silicon carbide coating. The slurry can include solid particles and carbonaceous resin. The solid particles can include silicon carbide particles, silicon particles, and carbon particles. The method can also include heating the slurry and repairing the silicon carbide coating with the solid particles and the carbonaceous resin in the damaged region.

In some embodiments, heating the slurry can include melting the silicon particles and pyrolyzing the carbonaceous resin. Repairing the silicon carbide coating can include the melted silicon particles reacting with the carbon particles and pyrolyzed char from the carbonaceous resin.

In some instances, the silicon carbide coating can be on a carbon material. Repairing the silicon carbide coating can include the melted silicon particles reacting with less than or equal to 5 percent of carbon of the carbon material.

In some instances, repairing the silicon carbide coating can include the carbon particles expanding and filling pores of the repaired silicon carbide coating in the damaged region.

In some methods, the repaired silicon carbide coating in the damaged region can have no more than 5% of porosity.

In some embodiments, the method can further include applying a silicon coating over the applied slurry.

BRIEF DESCRIPTION OF THE DRAWINGS

In the following detailed description, reference is made to the accompanying drawings, which form a part hereof.

Understanding that these drawings depict only several embodiments in accordance with the present disclosure and are not to be considered limiting of its scope, the present disclosure will be described with additional specificity and detail through use of the accompanying drawings. In the drawings, similar symbols typically identify similar components, unless context dictates otherwise. In some drawings, various structures according to embodiments of the present disclosure are schematically shown. However, the drawings are not necessarily drawn to scale, and some features may be enlarged while some features may be omitted for the sake of clarity. The relative dimensions and proportions as shown are not intended to limit the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Carbon carbon (C/C) composite materials, for example carbon fibers in a carbon matrix material, can provide a lightweight material with excellent mechanical properties at high temperatures. Such materials can be particularly advantageous in applications subjected to a rapid increase in temperature. Some applications include but are not limited to components for aircraft, spacecraft, rockets, missiles, and other vehicles. For example, C/C composites can be used for components in heavy-lift orbital launch vehicles, lunar landers, hypersonic missiles, hypersonic vehicles, thermal protection systems for space vehicles, rocket motor nozzles throats, rocket exit cones, rocket nose cones, aircraft brakes, etc. These applications can also be subjected to highly corrosive environments. Silicon carbide can be used as an antioxidation (AO) coating for C/C composite material. Typically, the denser the AO coating, the better the oxidation resistance. Fabricating an AO coating can involve conversion of an external surface of the C/C composite material (for example, silicon reacting with carbon from the composite material to form a silicon carbide coating), which can reduce the cross section of the composite material and therefore also decrease the strength of the material. In addition, an AO coating can be locally chipped during handling and extremely harsh conditions. Embodiments of the present disclosure generally relate to the fabrication and repair of silicon carbide coatings on carbon materials, for example, on C/C composite materials for components described above and for any other structure including C/C composite materials. Other examples of carbon materials include carbon silicon carbide (C/SiC) composite materials (for example, carbon fibers in a silicon carbide matrix material) and carbon carbon-silicon carbide (C/C—SiC) composite material (for example, carbon fibers in a carbon-silicon carbide matrix material). In various embodiments, a slurry is provided which can form a relatively dense silicon carbide coating for oxidation resistance. In various embodiments, a slurry is provided which can advantageously allow methods of fabrication and repair to be simple and cost-effective, for example, with few processing steps, while not compromising the dimensions or strength of the underlying material.

Figure 1:
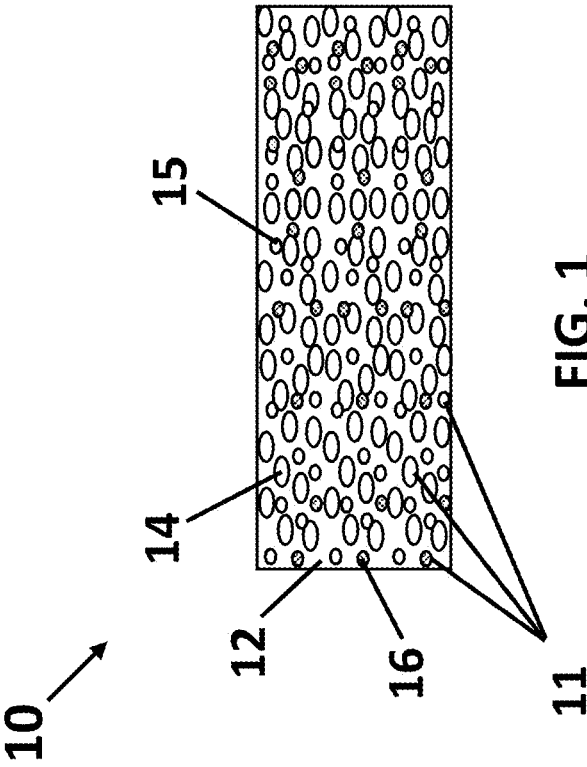
FIG. 1 is a schematic illustration of a slurry for use to form or repair a silicon carbide coating according to the present disclosure.

Various example embodiments of compositions and methods according to the present disclosure will now be described with reference to the figures. As will be described below, compositions according to the present disclosure can include a slurry or other semiliquid mixture, but it will be understood that the present disclosure is not limited to slurries and any mixture of insoluble solids suspended in a liquid can be suitably implemented. FIG. 1 is a schematic illustration of an example slurry 10 for use to form or repair a silicon carbide coating according to the present disclosure. The slurry 10 can include solid particles 11 and a resin 12. The solid particles 11 can include silicon carbide particles 14, silicon particles 15, and carbon particles 16. In various embodiments, the silicon carbide particles 14 can include any type of silicon carbide, such as silicon carbide in the alpha phase or silicon carbide in the beta phase. In various embodiments, the silicon particles 15 can be 95 to 100% pure silicon. For example, the silicon particles 15 can include pure silicon or silicon alloyed with up to 5% of other elements, such as boron The carbon particles 16 can include any type of carbon, such as diamond, graphite, and/or carbon black. The resin 12 can include carbonaceous resin, for example, phenolic ester or cyanate ester. In various embodiments, the solid particles 11 can be mixed with the resin 12 to form the slurry 10. The slurry 10 can have a texture of paste such that it can be applied on the underlying material. The viscosity of the slurry can be in the range from 800 to 2000 cP (or mPa·s). For example, the viscosity can be 800, 900, 1000, 1100, 1200, 1300, 1400, 1500, 1600, 1700, 1800, 1900, 2000 cP (or mPa·s) or any other viscosity within this range. In some embodiments, the viscosity can be within any range within this range, for example, any range formed by any of the foregoing values, such as 900 to 2000 cP, 900 to 1900 cP, 900 to 1800 cP, 1000 to 2000 cP, 1000 to 1900 cP, 1000 to 1800 cP, etc. In some instances, the slurry 10 can also include other solid particles and resins.

When the slurry 10 is heated, the silicon particles 15 can react with the carbon particles 16 and/or with carbon formed from the carbonaceous resin 12 to form silicon carbide. Having silicon carbide particles 14 in the slurry 10 can reduce the amount of other materials (e.g., silicon, carbon, and carbonaceous resin) in the slurry 10 and help decrease the time to form silicon carbide. In various embodiments, reducing the amount of silicon, carbon, and carbonaceous resin can make the process more repeatable and robust. Having carbon particles 16 in the slurry 10 can help provide a dense silicon carbide coating. For example, the carbon particles 16 (e.g., diamond) can expand (for example, up to 3.5 times) when reacting with silicon to fill in pores in the coating. Having an amount of carbon particles 16 in the slurry 10 can also advantageously reduce the amount of carbonaceous resin 12 in the slurry 10. Resin can shrink during heat treatment and/or pyrolysis with the remaining pores filled with silicon. In some embodiments, the amount of silicon can be relatively low and/or reduced (e.g., mini-mized in some instances) for higher temperature capability since silicon can melt at 1414° C.

The amount of silicon particles 15 in the slurry 10 can be determined based at least in part on the amount of carbon particles 16 in the slurry 10 and the amount of carbon that can be formed by the carbonaceous resin 12. Alternatively, the amount of carbon particles 16 and/or carbonaceous resin 12 in the slurry 10 can be determined based at least in part on the amount of silicon particles 15 in the slurry 10. As an example, the amount of silicon particles 15 in the slurry 10 can be determined to react substantially with the carbon particles 16 in the slurry 10 and with the carbon formed by the carbonaceous resin 12, and hence to reduce the amount of silicon particles 15 that may react with carbon in the underlying material (for example, with the carbon material on which the slurry will be applied to form the silicon carbide coating). In various embodiments, the slurry 10 can be configured to form silicon carbide from substantially all the components in the slurry 10. In some embodiments, the composition of the slurry 10 can also account for any layers used in conjunction with the slurry 10 (for example, any additional layers such as silicon layers that may be applied before and/or after the slurry 10 as will be described herein). The present disclosure is not intended to be limited to exact compositions, but some non-limiting example compositions are provided herein. Other examples are possible.

In various embodiments, the solid particles 11 can form 25 to 80 volume percent of the slurry 10. For example, the volume percent of solid particles 11 in the slurry 10 can be 25, 30, 35, 40, 45, 50, 55, 60, 65, 70, 75, 80 volume percent, or any other volume percent within this range. In some embodiments, the volume percent of solid particles 11 can be a volume percent within any range within this range, for example, any range formed by any of the foregoing values, such as 25 to 75 volume percent, 25 to 70 volume percent, 25 to 65 volume percent, 25 to 60 volume percent, 30 to 80 volume percent, 30 to 75 volume percent, 30 to 70 volume percent, 30 to 65 volume percent, 30 to 60 volume percent, 35 to 80 volume percent, 35 to 75 volume percent, 35 to 70 volume percent, 35 to 65 volume percent, 40 to 80 volume percent, 40 to 75 volume percent, 40 to 70 volume percent, 40 to 65 volume percent, 50 to 80 volume percent, etc.

In certain embodiments, the solid particles 11 can include 40 to 70 volume percent silicon carbide particles 14. For example, the solid particles 11 can include 40, 45, 50, 55, 60, 65, 70 volume percent silicon carbide particles 14, or any other volume percent within this range. In some embodi-ments, the solid particles 11 can include a volume percent of silicon carbide particles that is in any range within this range, for example, any range formed by any of the fore-going values, such as 40 to 65 volume percent, 45 to 70 volume percent, 45 to 65 volume percent, 50 to 70 volume percent, 50 to 65 volume percent, etc.

In various implementations, the silicon carbide particles 14 can have an average particle size (for example, an average diameter or an average largest dimension) or a median particle size (for example, a median diameter or a median largest dimension) in the range of 0.5 to 20 microns.

For example, the average particle size or median particle size can be 0.5, 1, 5, 10, 15, 20 microns, or any other size within this range. In some embodiments, the average particle size or median particle size can be in any range within this range, for example, any range formed by any of the fore-going values, such as 0.5 to 15 microns, 0.5 to 10 microns, 1 to 20 microns, 1 to 15 microns, 1 to 10 microns, 5 to 20 microns, 5 to 15 microns, 5 to 10 microns, etc. In some instances, the silicon carbide particles can have a particle size (for example, diameter or largest dimension) with a bimodal distribution. In some instances, the silicon carbide particles can have multiple particle sizes. Having a bimodal distribution or multiple particles sizes can enhance packing density in various embodiments.

In some embodiments, the solid particles 11 can include 25 to 60 volume percent silicon particles 15. For example, the solid particles 11 can include 25, 30, 35, 40, 45, 50, 55, 60 volume percent silicon particles 15, or any other volume percent within this range. In some embodiments, the solid particles 11 can include a volume percent of silicon particles that is in any range within this range, for example, any range formed by any of the foregoing values, such as 25 to 55 volume percent, 25 to 50 volume percent, 30 to 60 volume percent, 30 to 55 volume percent, etc.

In various implementations, the silicon particles 15 can have an average particle size (for example, an average diameter or an average largest dimension) or a median particle size (for example, a median diameter or a median largest dimension) in the range of 5 to 20 microns. For example, the average particle size or median particle size can be 5, 10, 15, 20 microns, or any other size within this range. In some embodiments, the average particle size or median particle size can be in any range within this range, for example, any range formed by any of the foregoing values, such as 5 to 15 microns, 5 to 10 microns, 7 to 20 microns, 7 to 15 microns, 10 to 20 microns, 10 to 15 microns, 15 to 20 microns, etc.

In some embodiments, the solid particles 11 can include less than or equal to 10 volume percent carbon particles 16. For example, the solid particles 11 can include 0.1, 0.2, 0.3, 0.4, 0.5, 1, 2, 3, 4, 5, 6, 7, 8, 9, 10 volume percent carbon particles 16, or any other volume percent within this range. In some embodiments, the solid particles 11 can include a volume percent of silicon particles that is in any range within this range, such as 0.1 to 10 volume percent, 0.1 to 9 volume percent, 0.1 to 8 volume percent, 0.1 to 7 volume percent, 0.1 to 6 volume percent, 0.1 to 5 volume percent, 0.2 to 10 volume percent, 0.2 to 9 volume percent, 0.2 to 8 volume percent, 0.2 to 7 volume percent, 0.2 to 6 volume percent, 0.2 to 5 volume percent, 0.5 to 10 volume percent, 0.5 to 9 volume percent, 0.5 to 8 volume percent, 0.5 to 7 volume percent, 0.5 to 6 volume percent, 0.5 to 5 volume percent, 1 to 10 volume percent, 1 to 9 volume percent, 1 to 8 volume percent, 1 to 7 volume percent, 1 to 6 volume percent, 1 to 5 volume percent, etc.

In various implementations, the carbon particles 16 can have an average particle size (for example, an average diameter or an average largest dimension) or a median particle size (for example, a median diameter or a median largest dimension) in the range of 0.5 to 5 microns. For example, the average particle size or median particle size can be 0.5, 1, 2, 3, 4, 5 microns, or any other size within this range. In some embodiments, the average particle size or median particle size can be in any range within this range, for example, any range formed by any of the foregoing values, such as 0.5 to 4 microns, 0.5 to 3 microns, 1 to 5 microns, 1 to 4 microns, 1 to 3 microns, etc. In various embodiments, a smaller particle size for the carbon particles may be preferred as a larger particle size may not be fully converted to SiC. In addition, a smaller particle size may be preferred in some instances since a larger particle size (e.g., with graphite and carbon black) may increase the viscosity to a range that is not optimal.

Figure 2A:
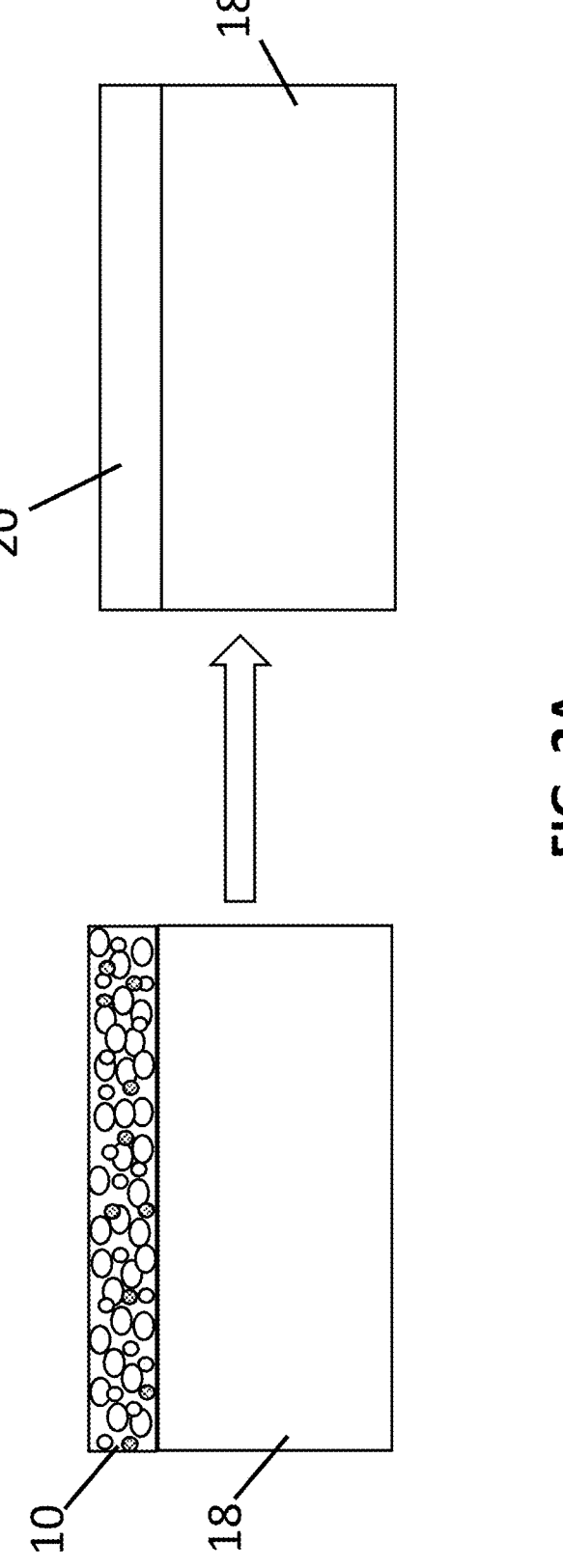
FIG. 2A is a schematic illustration of an example method of fabricating a silicon carbide coating using the slurry of FIG. 1 according to the present disclosure.

FIG. 2A is a schematic illustration of an example method of fabricating a silicon carbide coating using the slurry of FIG. 1 according to the present disclosure. As illustrated, the slurry 10 can be applied to a material 18, for example, a carbon material, such as a C/C composite material, C/SiC composite material, or C/C—SiC composite material. When heated, the slurry 10 can form into a silicon carbide coating 20 to help protect the underlying material 18. For example, the slurry 10 can be applied on a component for launch vehicles, lunar landers, hypersonic missiles, hypersonic vehicles, thermal protection systems for space vehicles, rocket motor nozzles throats, rocket exit cones, rocket nose cones, aircraft brakes, etc. which may be fabricated with a C/C composite material.

Figure 2B:
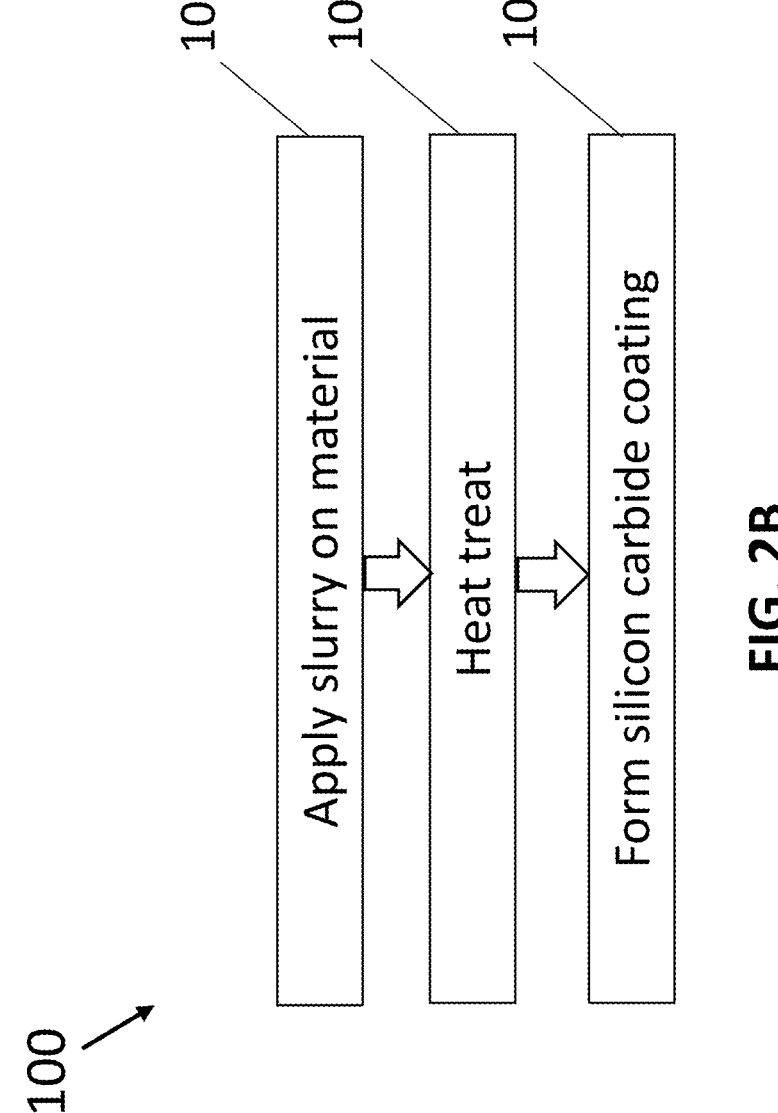
FIG. 2B is a flow chart representing the example method of fabricating a silicon carbide coating as shown in FIG. 2A.

FIG. 2B is a flow chart representing the example method 100 of fabricating a silicon carbide coating 20 as shown in FIG. 2A according to an embodiment of the present disclosure. The method 100 can begin at block 102, where the slurry 10 is applied on (for example, over) the material 18. The slurry 10 can be applied using any method known in the art or yet to be developed. For example, the slurry 10 can be brushed-on, dip coated, or casted. In some instances, casting in a mold can help improve surface finish and dimensional conformance.

Moving to block 104, the slurry 10 can undergo a heat treatment. The heat treatment can include curing the resin 12 either simultaneously with or sequentially to (for example, prior to) heating the slurry 10 to a temperature above the melting temperature of silicon (for example, greater than 1414° C.). For example, the slurry can be heated to a temperature greater than 1420° C., greater than 1425° C., greater than 1430° C., greater than 1435° C., greater than 1440° C., greater than 1445° C., greater than 1450° C., etc. In some instances, the slurry 10 can be heated to a temperature in the range of 1414° C. to 1500° C. For example, the temperature can be 1420° C., 1425° C., 1430° C., 1435° C., 1440° C., 1445° C., 1450° C., 1455° C., 1460° C., 1465° C., 1470° C., 1475° C., 1480° C., 1485° C., 1490° C., 1495° C., 1500° C., or any other temperature within this range. In some embodiments, the temperature can be in any range within this range, for example, any range formed by any of the foregoing values, such as 1414° C. to 1495° C., 1414° C. to 1490° C., 1420° C. to 1500° C., 1420° C. to 1495° C., 1420° C. to 1490° C., 1425° C. to 1500° C., 1425° C. to 1495° C., 1425° C. to 1490° C., 1430° C. to 1500° C., 1430° C. to 1495° C., 1430° C. to 1490° C., 1440° C. to 1500° C., 1440° C. to 1495° C., 1440° C. to 1490° C., 1450° C. to 1500° C., 1450° C. to 1495° C., 1450° C. to 1490° C., etc. In various implementations, the heat treatment can include a vacuum heat treatment or a heat treatment in an inert atmosphere to help melt the silicon. In addition, the heat treatment can pyrolyze the carbonaceous resin 12 to form a carbon char. The heat treatment can melt the silicon particles 15 so that they can react with the carbon particles 16 and the pyrolyzed char. As shown in block 105, the silicon carbide coating 20 can form from the solid particles 11 and the carbonaceous resin 12. In various embodiments, the melted silicon particles 15 can react with less than or equal to 5 percent of carbon of the underlying material 18 (for example, less than or equal to 5 percent of carbon from the C/C composite material). For example, the melted silicon particles 15 may react with 0, 0.1, 0.2, 0.3, 0.4, 0.5, 1, 2, 3, 4, 4.5, 5 percent of carbon of the underlying material 18, or any other percent within this range. In some embodiments, the melted silicon particles 15 can react with a percent of carbon of the underlying material 18 that is in any range within this range, for example, any range formed by any of the foregoing values, such as 0 to 4.5 percent, 0 to 4 percent, 0 to 3 percent, etc. As described herein, by limiting the amount of carbon reacting from the underlying material 18, the dimensions and strength of the underlying material 18 need not be compromised. As also described herein, the carbon particles 16 can expand and fill pores of the silicon carbide coating 20 to improve the density of the coating 20. In various embodiments, the silicon carbide coating 20 has no more than 5% of porosity (e.g., no more than 4.5%, no more than 4%, no more than 3.5%, no more than 3%, no more than 2.5%, no more than 2%, no more than 1.5%, no more than 1% of porosity, etc.). Accordingly, the silicon carbide coating 20 can have 0 to 5% porosity. For example, the silicon carbide coating 20 can have 0%, 0.5%, 1%, 1.5%, 2%, 2.5%, 3%, 3.5%, 4%, 4.5%, 5% porosity, or any other amount of porosity within this range. In some embodiments, the amount of porosity can be in any range within this range, for example, any range formed by any of the foregoing values, such as 0 to 4.5% porosity, 0 to 4% porosity, 0 to 3.5% porosity, 0 to 3% porosity, 0.5 to 5% porosity, 0.5 to 4.5% porosity, 0.5 to 4% porosity, 0.5 to 3.5% porosity, 0.5 to 3% porosity, 1 to 5% porosity, 1 to 4.5% porosity, 1 to 4% porosity, 1 to 3.5% porosity, 1 to 3% porosity, 2 to 5% porosity, 3 to 5% porosity, etc.

In various implementations, a thinner silicon carbide coating may be stronger, but the oxidation resistance may be lower than a thicker coating. In some embodiments, the silicon carbide coating 20 can have a thickness configured to provide both strength and oxidation resistance. As example embodiments, the underlying material 18 can have a thickness in the range from 0.010 to 0.040 inch (or 0.254 to 1.016 mm), the slurry 10 can have a thickness in the range from 0.002 to 0.015 inch (or 50.8 to 381 microns), and the silicon carbide coating 20 can have a thickness in the range from 0.002 to 0.015 inch (or 50.8 to 381 microns). Other examples are possible.

Figure 3A:
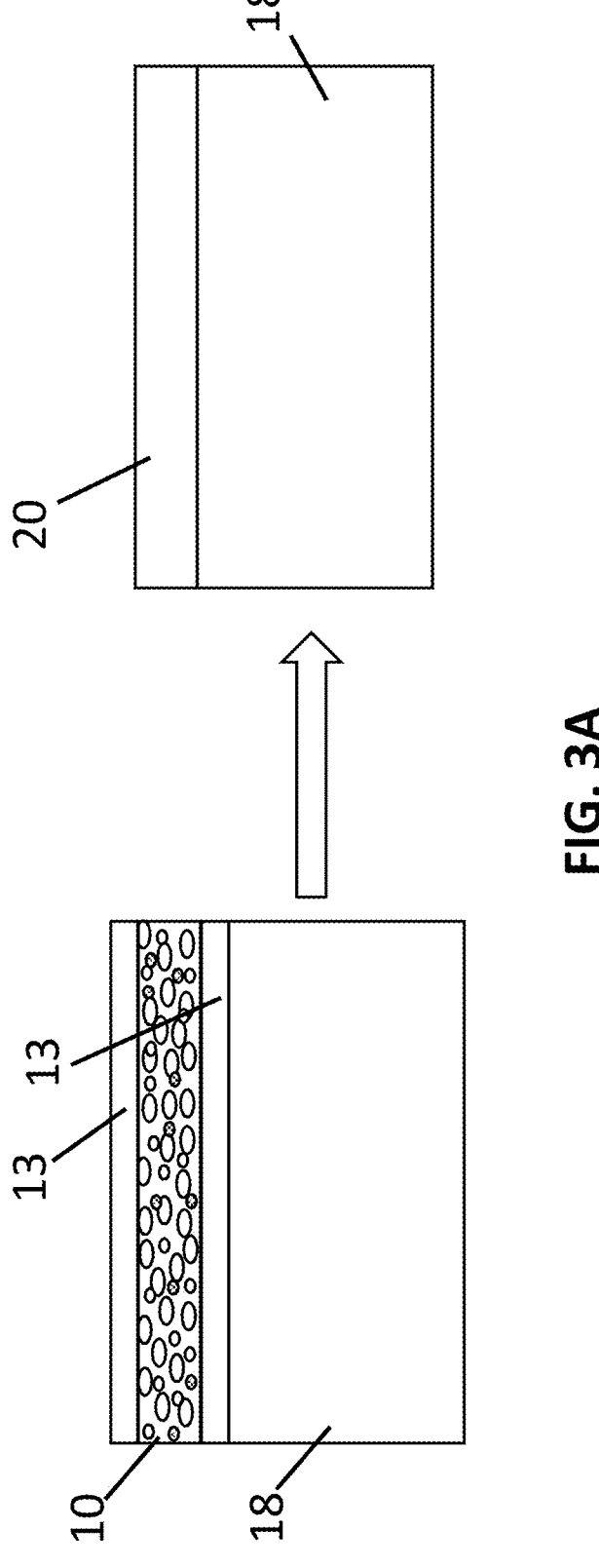
FIG. 3A is a schematic illustration of another example method of fabricating a silicon carbide coating using the slurry of FIG. 1 according to the present disclosure.

FIG. 3A is a schematic illustration of another example method of fabricating a silicon carbide coating using the slurry of FIG. 1 according to the present disclosure. The illustrated method can be similar to the one shown in FIG. 2A, except that a thin layer of a silicon coating 13 can be applied on the material 18 prior to and/or after applying the slurry 10. For example, the silicon coating 13 can have a thickness in the range from 0.001 to 0.005 inch (or 25.4 to 127 microns). The silicon coating 13 can be provided so that any remaining carbon particles 16 from the slurry 10 and/or carbon formed from the carbonaceous resin 12 can be converted to silicon carbide.

Figure 3B:
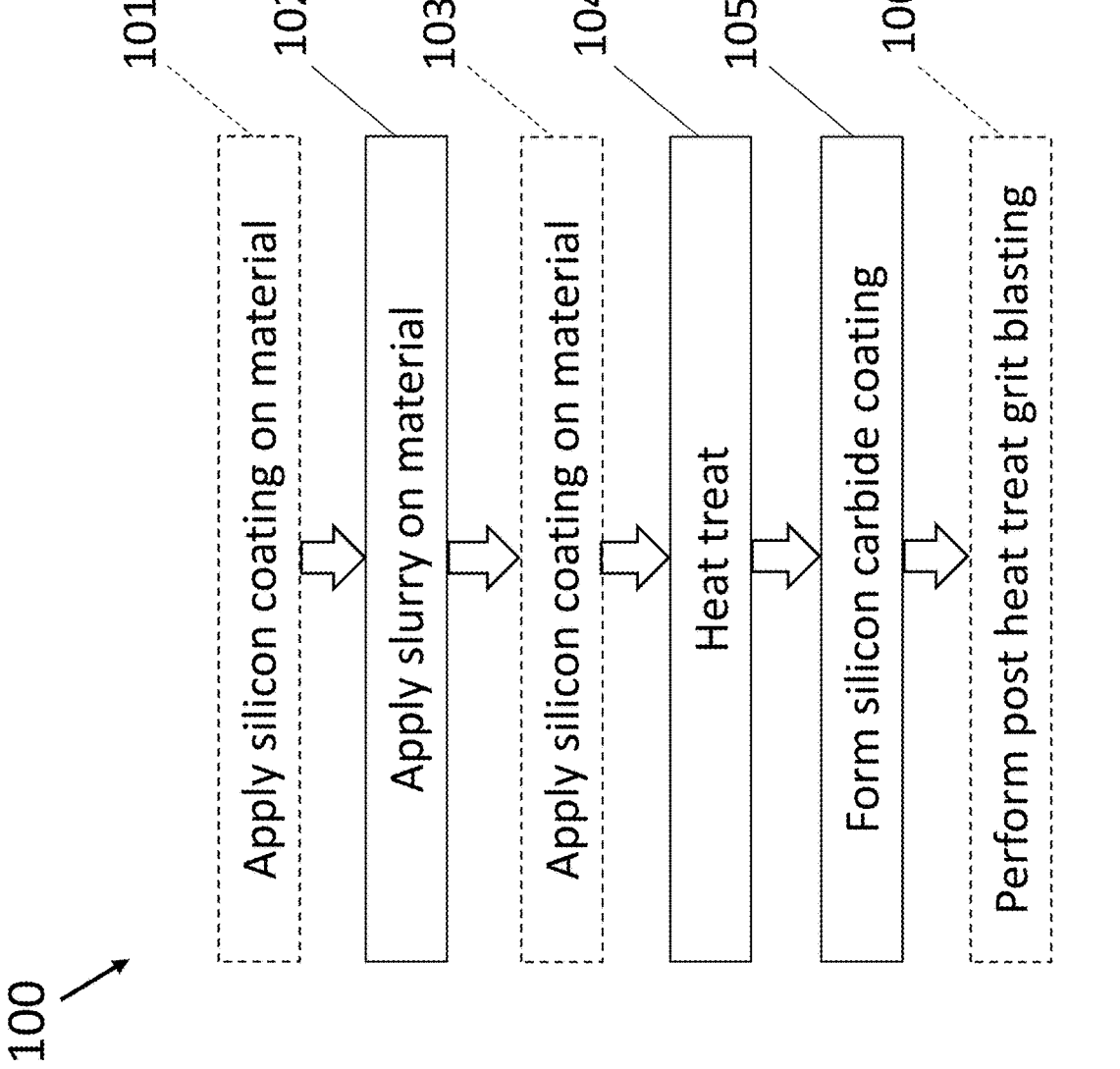
FIG. 3B is a flow chart representing the example method of fabricating a silicon carbide coating as shown in FIG. 3A.

FIG. 3B is a flow chart representing an example method 100 of fabricating a silicon carbide coating 20 as shown in FIG. 3A according to an embodiment of the present disclosure. The illustrated method 100 can be similar to the method 100 shown in FIG. 2B, except that the method 100 of FIG. 3B can include one or more additional optional blocks 101, 103, 106. For example, as shown in FIG. 3B, the method 100 can also include applying a thin layer of a silicon coating 13 on the material 18 prior to and/or after applying the slurry 10, as shown in blocks 101-103. For example, a silicon coating 13 can be applied at the interface of (for example, between) the material 18 and the slurry 10 and/or on the slurry 10. The silicon coating 13 can include silicon particles/powder. The silicon in the silicon coating 13 can melt and infiltrate into the slurry 10 upon heat treatment. In some instances, the silicon particles can be similar to those used in the slurry 10. The silicon particles can be 95 to 100% pure silicon. The silicon coating 13 can be applied using any method known in the art or yet to be developed. In some embodiments, the silicon coating 13 can be deposited by plasma spray, physical vapor deposition, or laser cladding. In some embodiments as shown in block 106, the method 100 can also include grit blasting post heat treatment. In various instances, grit blasting can clean the surface and improve adhesion.

Figure 4A:
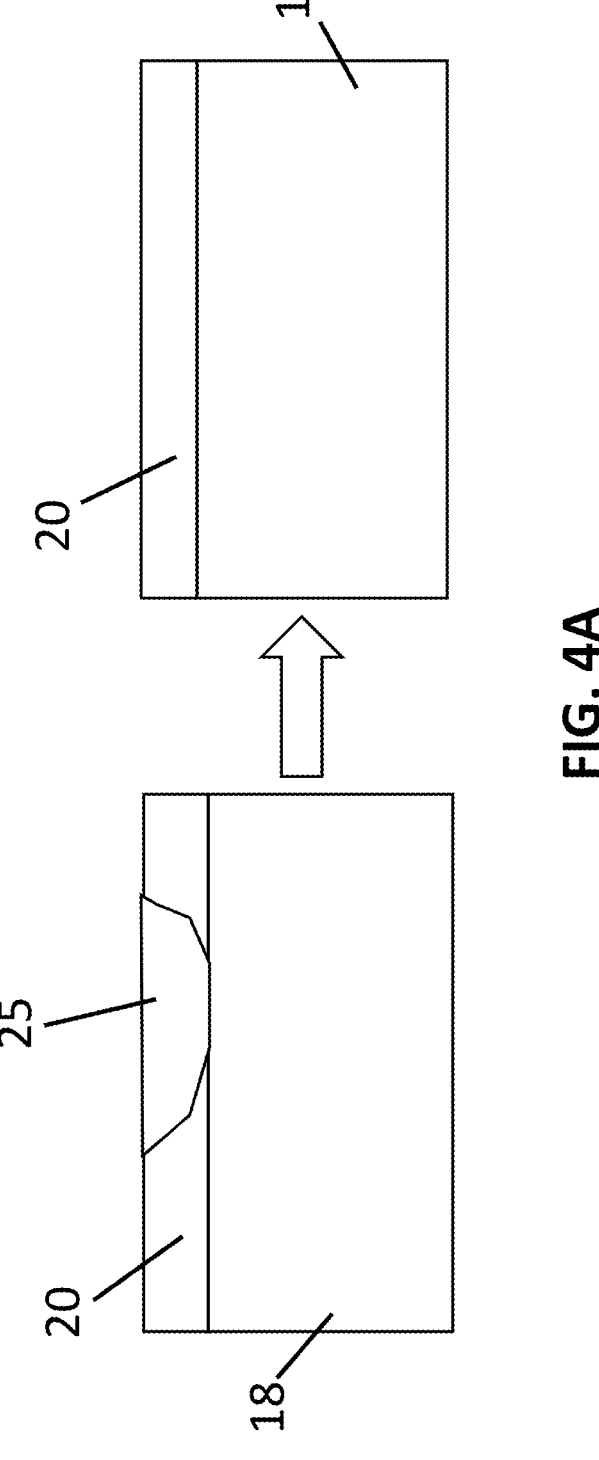
FIG. 4A is a schematic illustration of an example method of repairing a silicon carbide coating using the slurry of FIG. 1 according to the present disclosure.

FIG. 4A is a schematic illustration of an example method of repairing a silicon carbide coating using the slurry of FIG. 1 according to the present disclosure. As illustrated, the silicon carbide coating 20 can be locally chipped or damaged, for example, it may have a damaged region 25. In some instances, the damaged region 25 could be caused by chips in the coating 20 caused by impact with objects in the atmosphere during a rocket launch, and/or cracks in the coating 20 caused by vibrations or flexing of the underlying material 18 during and after reentry and rain erosion. The slurry 10 can be applied to the damaged region 25 of the silicon carbide coating 20. When heated, the slurry 10 can repair the silicon carbide coating 20 with the solid particles 11 and the carbonaceous resin 12 in the damaged region 25.

Figure 4B:
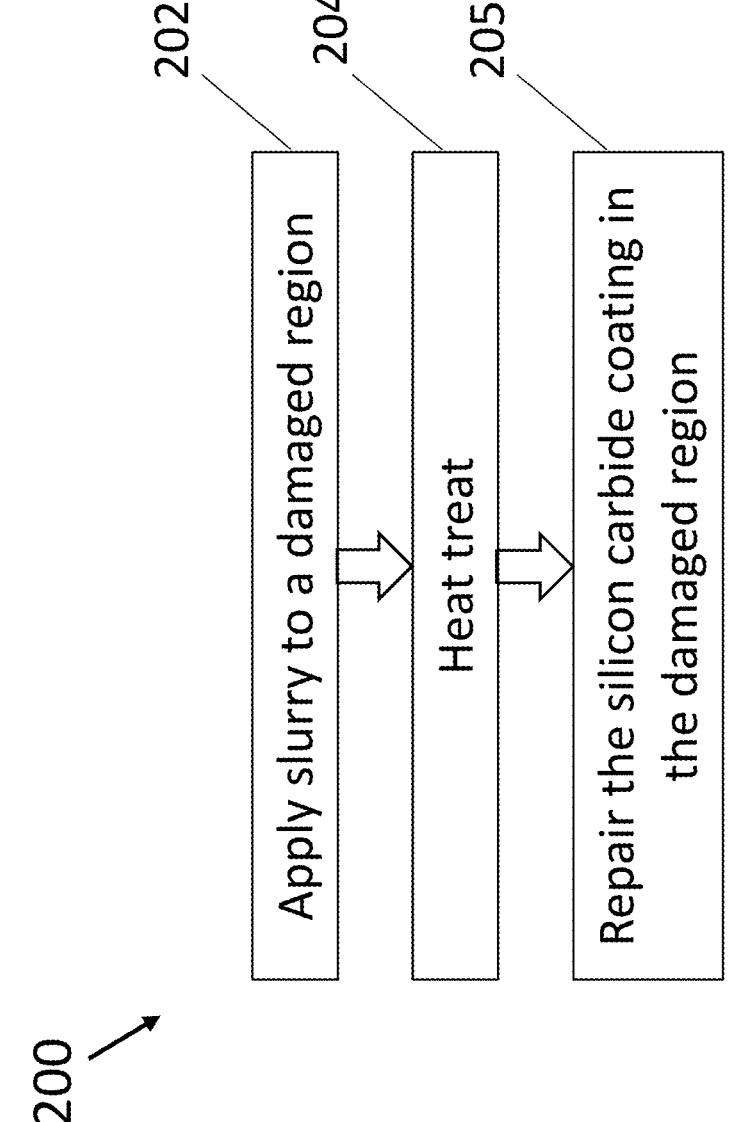
FIG. 4B is a flow chart representing the example method of repairing a silicon carbide coating as shown in FIG. 4A.

FIG. 4B is a flow chart representing the example method 200 of repairing a silicon carbide coating 20 as shown in FIG. 4A according to an embodiment of the present disclosure. The method 200 can begin at block 202, where the slurry 10 is applied to the damaged region 25. The slurry 10 can be applied using any method known in the art or yet to be developed. For example, the slurry 10 can be selectively applied to the damaged region 25.

Moving to block 204, the slurry 10 can undergo a heat treatment. The heat treatment can be similar to the heat treatment discussed with relation to block 104 in FIGS. 2B and 3B. For example, the heat treatment can include curing of the resin 12 either simultaneously with or sequentially to (for example, prior to) heating the slurry 10 to a temperature above the melting temperature of silicon (for example, greater than 1414° C.). For example, the slurry can be heated to a temperature greater than 1420° C., greater than 1425° C., greater than 1430° C., greater than 1435° C., greater than 1440° C., greater than 1445° C., greater than 1450° C., etc. In some instances, the slurry 10 can be heated to a temperature in the range of 1414° C. to 1500° C. For example, the temperature can be 1420° C., 1425° C., 1430° C., 1435° C., 1440° C., 1445° C., 1450° C., 1455° C., 1460° C., 1465° C., 1470° C., 1475° C., 1480° C., 1485° C., 1490° C., 1495° C., 1500° C., or any other temperature within this range. In some embodiments, the temperature can be in any range within this range, for example, any range formed by any of the foregoing values, such as 1414° C. to 1495° C., 1414° C. to 1490° C., 1420° C. to 1500° C., 1420° C. to 1495° C., 1420° C. to 1490° C., 1425° C. to 1500° C., 1425° C. to 1495° C., 1425° C. to 1490° C., 1430° C. to 1500° C., 1430° C. to 1495° C., 1430° C. to 1490° C., 1440° C. to 1500° C., 1440° C. to 1495° C., 1440° C. to 1490° C., 1450° C. to 1500° C., 1450° C. to 1495° C., 1450° C. to 1490° C., etc. In various implementations, the heat treatment can include a vacuum heat treatment or a heat treatment in an inert atmosphere to help melt the silicon. In addition, the heat treatment can pyrolyze the carbonaceous resin 12 to form a carbon char. The heat treatment can melt the silicon particles 15 so that they can react with the carbon particles 16 and the pyrolyzed char. As shown in block 205, the silicon carbide coating 20 can be repaired with the solid particles 11 and the carbonaceous resin 12. In various embodiments, the melted silicon particles 15 can react with less than or equal to 5 percent of carbon of the underlying material 18 (for example, less than or equal to 5 percent of carbon from the C/C composite material). For example, the melted silicon particles 15 may react with 0, 0.1, 0.2, 0.3, 0.4, 0.5, 1, 2, 3, 4, 4.5, 5 percent of carbon of the underlying material 18, or any other percent within this range. In some embodiments, the melted silicon particles 15 can react with a percent of carbon of the underlying material 18 that is in any range within this range, for example, any range formed by any of the foregoing values, such as 0 to 4.5 percent, 0 to 4 percent, 0 to 3 percent, etc. As described herein, by limiting the amount of carbon reacting from the underlying material 18, the dimensions and strength of the underlying material 18 need not be compromised. As also described herein, the carbon particles 16 can expand and fill pores of the silicon carbide coating 20 to improve the density of the repaired coating 20 in the damaged region 25. In various embodiments, the repaired silicon carbide coating 20 in the damaged region 25 has no more than 5% of porosity (e.g., no more than 4.5%, no more than 4%, no more than 3.5%, no more than 3%, no more than 2.5%, no more than 2%, no more than 1.5%, no more than 1% of porosity, etc.). Accordingly, the repaired silicon carbide coating 20 in the damaged region 25 can have 0 to 5% porosity. For example, the repaired silicon carbide coating 20 in the damaged region 25 can have 0%, 0.5%, 1%, 1.5%, 2%, 2.5%, 3%, 3.5%, 4%, 4.5%, 5% porosity, or any other amount of porosity within this range. In some embodiments, the amount of porosity can be in any range within this range, for example, any range formed by any of the foregoing values, such as 0 to 4.5% porosity, 0 to 4% porosity, 0 to 3.5% porosity, 0 to 3% porosity, 0.5 to 5% porosity, 0.5 to 4.5% porosity, 0.5 to 4% porosity, 0.5 to 3.5% porosity, 0.5 to 3% porosity, 1 to 5% porosity, 1 to 4.5% porosity, 1 to 4% porosity, 1 to 3.5% porosity, 1 to 3% porosity, 2 to 5% porosity, 3 to 5% porosity, etc.

Figure 4C:
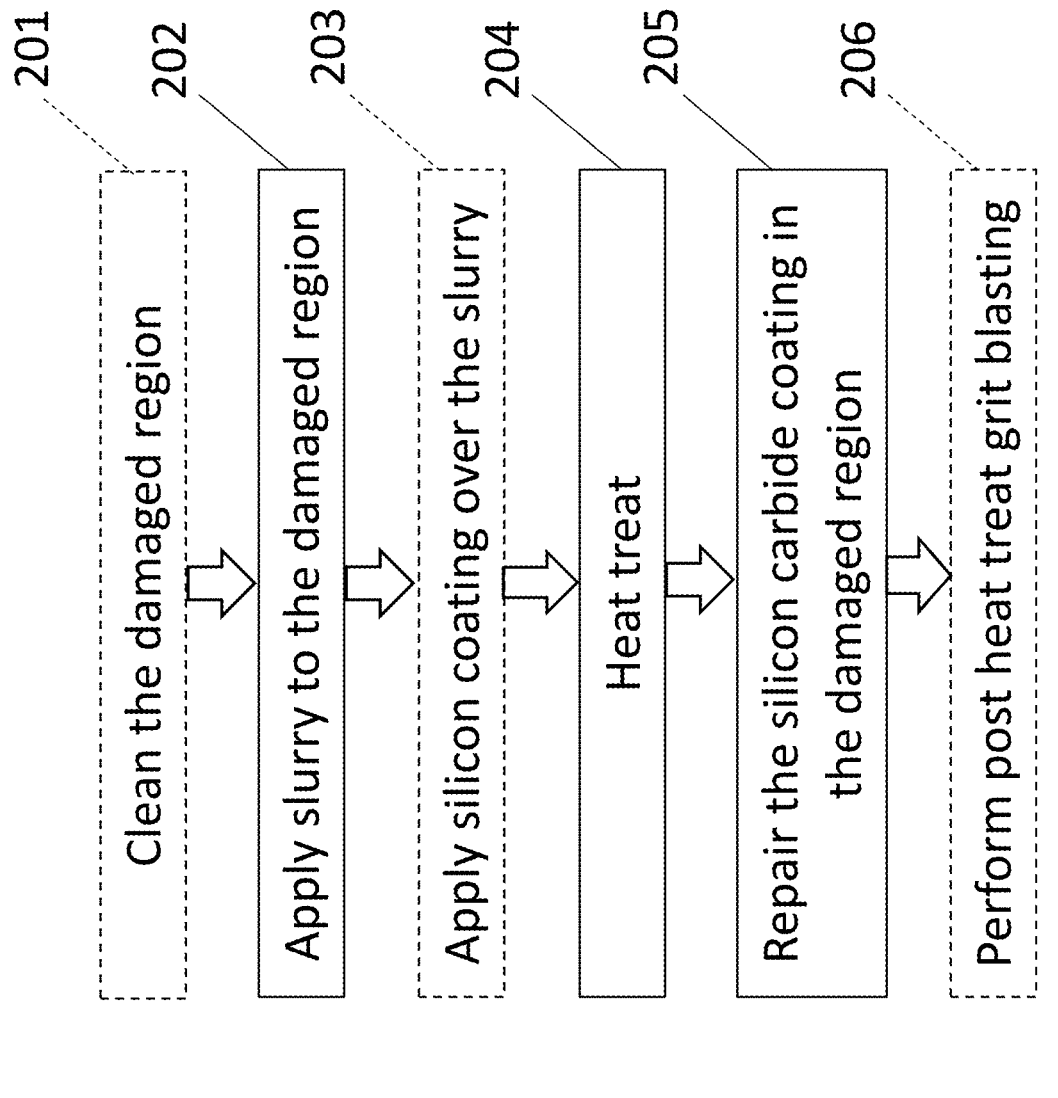
FIG. 4C is another flow chart representing the example method of repairing a silicon carbide coating as shown in FIG. 4A.

FIG. 4C is another flow chart representing an example method 200 of repairing a silicon carbide coating as shown in FIG. 4A according to an embodiment of the present disclosure. The illustrated method 200 can be similar to the method 200 shown in FIG. 4B, except that the method 200 of FIG. 4C can include one or more additional optional blocks 201, 203, 206. For example, as shown in block 201, the method 200 can also include cleaning the damaged region 25 before applying the slurry 10 to the damaged region 25. The damaged region 25 can be cleaned using any method known in the art or yet to be developed. For example, the damaged area can be polished and/or light grit blasting. For example, light grit blasting using 220 grit at 20 to 40 psi blasting can be used for surface cleaning (e.g., oxide removal) and to improve adhesion of the slurry 10. As another example, the method 200 can also include applying a thin layer of a silicon coating over the slurry 10, as shown in block 203. The silicon coating can be similar to the silicon coating 13 discussed with relation to block 103 in FIG. 3B. For example, the silicon coating can be provided so that any remaining carbon particles from the slurry 10 and/or carbon formed from the carbonaceous resin can be converted to silicon carbide. For example, the silicon coating can include silicon powder. The silicon in the silicon coating can melt and infiltrate into the slurry upon heat treatment. In some instances, the silicon particles can be similar to those used in the slurry 10. The silicon particles can be 95 to 100% pure silicon. The silicon coating 13 can be applied in any method known in the art or yet to be developed. In some embodiments, the silicon coating 13 can be deposited as an overcoat. The silicon coating 13 can be provided so that any remaining carbon particles 16 from the slurry 10 and/or carbon formed from the carbonaceous resin 12 can be converted to silicon carbide. In some embodiments as shown in block 206, the method 200 can also include grit blasting post heat treatment. The grit blasting can be similar to the grit blasting discussed with relation to block 106 in FIG. 3B. In various instances, grit blasting can clean the surface and improve adhesion.

As described herein, various embodiments of the present disclosure can provide a slurry for use to fabricate and repair a silicon carbide coating on a carbon material such as a C/C composite material, C/SiC composite material, or C/C—SiC composite material. In various embodiments, the slurry can form a relatively dense silicon carbide coating. Methods of fabrication and repair using the slurry described herein can be simple and cost effective, for example, with few processing steps, while not compromising the dimensions or strength of the underlying material.

In some examples of the present disclosure, the methods can include additional blocks during which further processing is performed. In addition, it will be understood that the methods need not be performed in the order described and/or some steps may be omitted.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The detailed description is directed to certain specific embodiments of the present disclosure. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

The terminology used in the description presented herein is not intended to be interpreted in any limited or restrictive manner, simply because it is being utilized in conjunction with a detailed description of certain specific embodiments of the development. Furthermore, embodiments of the present disclosure may include several novel features, no single one of which is solely responsible for its desirable attributes or which is essential to practicing the present disclosure.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity. In addition, it will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities, dimensions, and so forth used in the specification and claims are to be understood as being modified in all instances by the term "about." Accordingly, unless indicated to the contrary, the numerical parameters set forth in the specification are approximations that may vary depending upon the desired properties sought to be obtained by embodiments of the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A slurry for use to form or repair a silicon carbide coating, the slurry comprising:

solid particles comprising:

silicon carbide particles, 25 to 60 volume percent silicon particles, and carbon particles; and a carbonaceous resin.

2. The slurry of claim 1, wherein the solid particles form 25 to 80 volume percent of the slurry.

3. The slurry of claim 1, wherein the solid particles comprise 40 to 70 volume percent silicon carbide particles and 25 to 55 volume percent silicon particles.

4. The slurry of claim 1, wherein the solid particles comprise less than or equal to 10 volume percent carbon particles.

5. The slurry of claim 1, wherein the carbon particles comprise diamond, graphite, and/or carbon black.

6. The slurry of claim 1, wherein the carbonaceous resin comprises phenolic ester or cyanate ester.

7. The slurry of claim 1, wherein the silicon carbide particles have an average particle size in the range of 0.5 to 20 microns.

8. The slurry of claim 1, wherein the silicon carbide particles have a particle size with a bimodal distribution.

9. The slurry of claim 1, wherein the silicon particles have an average particle size in the range of 5 to 20 microns.

10. The slurry of claim 1, wherein the carbon particles have an average particle size in the range of 0.5 to 5 microns.

11. A method of fabricating a silicon carbide coating on a carbon material, the method comprising:

applying the slurry of claim 1 on the carbon material;

heating the slurry; and forming the silicon carbide coating from the solid particles and the carbonaceous resin.

12. The method of claim 11, wherein heating the slurry comprises melting the silicon particles and pyrolyzing the carbonaceous resin, and wherein forming the silicon carbide coating comprises the melted silicon particles reacting with the carbon particles and pyrolyzed char from the carbonaceous resin.

13. The method of claim 12, wherein forming the silicon carbide coating comprises the melted silicon particles reacting with less than or equal to 5 percent of carbon of the carbon material.

14. The method of claim 11, wherein forming the silicon carbide coating comprises the carbon particles expanding and filling pores of the silicon carbide coating.

15. The method of claim 11, wherein the silicon carbide coating has no more than 5% of porosity.

16. The method of claim 11, further comprising applying a silicon coating on the carbon material.

17. The method of claim 16, wherein the silicon coating is applied prior to applying the slurry on the carbon material.

18. The method of claim 16, wherein the silicon coating is applied after applying the slurry on the carbon material.

19. The method of claim 11, wherein the carbon material is a carbon carbon (C/C) composite material, a carbon silicon carbide (C/SiC) composite material, or a carbon carbon-silicon carbide (C/C-SiC) composite material.

20. A method of repairing a silicon carbide coating, the method comprising:

applying the slurry of claim 1 to a damaged region of the silicon carbide coating;

heating the slurry; and repairing the silicon carbide coating with the solid particles and the carbonaceous resin in the damaged region.

21. The method of claim 20, wherein heating the slurry comprises melting the silicon particles and pyrolyzing the carbonaceous resin, and wherein repairing the silicon carbide coating comprises the melted silicon particles reacting with the carbon particles and pyrolyzed char from the carbonaceous resin.

22. The method of claim 20, wherein the silicon carbide coating is on a carbon material, and wherein repairing the silicon carbide coating comprises the melted silicon particles reacting with less than or equal to 5 percent of carbon of the carbon material.

23. The method of claim 20, wherein repairing the silicon carbide coating comprises the carbon particles expanding and filling pores of the repaired silicon carbide coating in the damaged region.

24. The method of claim 20, wherein the repaired silicon carbide coating in the damaged region has no more than 5% of porosity.

25. The method of claim 20, further comprising applying a silicon coating over the applied slurry.

* * * * *